No. 824,098. PATENTED JUNE 26, 1906.
J. T. DAWES.
WATER LEVEL INDICATOR.
APPLICATION FILED JUNE 23, 1905.
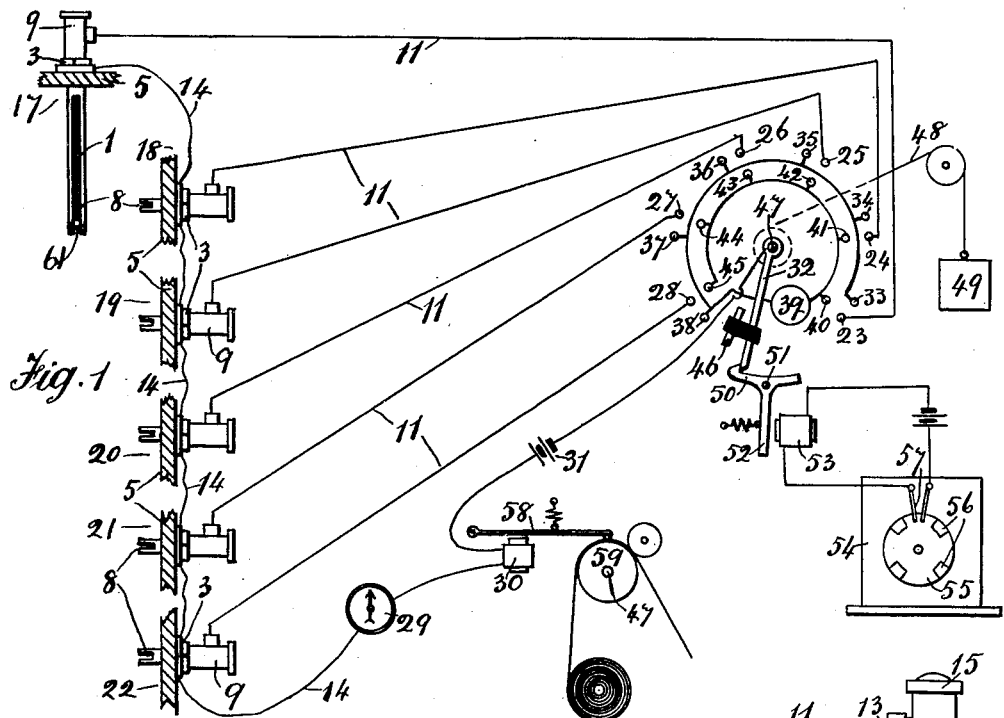
Fig. 1
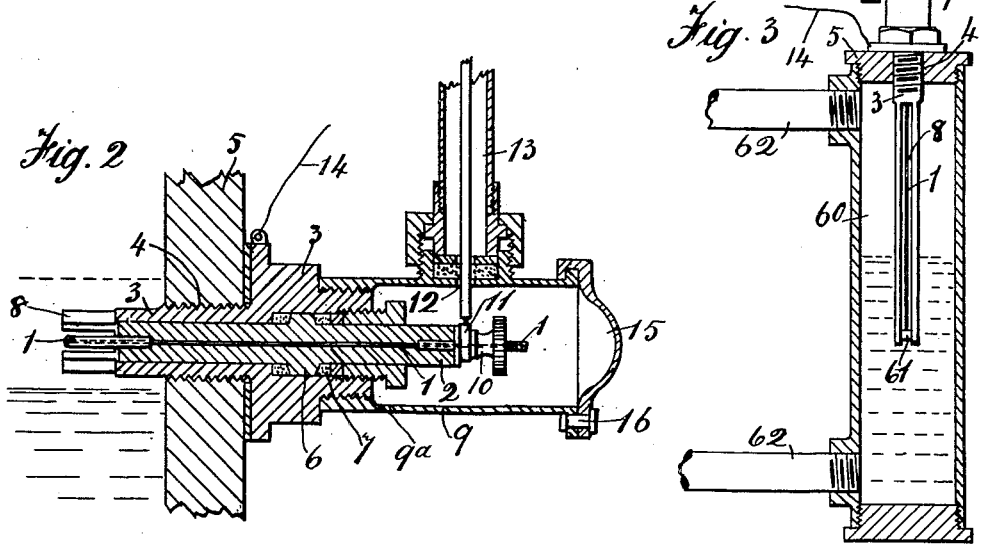
Fig. 2
Fig. 3
Witnesses
M. Johnson
H. Lightfoot.
Inventor
John Thomas Dawes

UNITED STATES PATENT OFFICE.

JOHN THOMAS DAWES, OF LIVERPOOL, ENGLAND.

WATER-LEVEL INDICATOR.

No. 824,098.     Specification of Letters Patent.     Patented June 26, 1906.

Application filed June 23, 1905. Serial No. 266,663.

*To all whom it may concern:*

Be it known that I, JOHN THOMAS DAWES, a subject of the King of Great Britain, residing at Liverpool, in the county of Lancaster, England, have invented new and useful Improvements in Water-Level Indicators for Steam-Boilers or Like Containers, of which the following is a specification.

The object of the invention is to provide means whereby an unsafe variation in the water-level in steam-boilers or like containers may be readily ascertained or recorded at a distance from the containers as a check upon the attendant. I attain this object by mechanism constructed and operating substantially as illustrated on the accompanying drawings, whereon—

Figure 1 is a general diagrammatic view of the appliances, and Fig. 2 is a sectional detail view of the contact-plug and connections inserted through the shell of the container. Fig. 3 is a detail view of a modification.

1 is an electric conducting-wire passing through a rod or plug 2, of porcelain or other electric insulating material, and secured tightly therein by fusing or otherwise. The rod 2 is inclosed in an outer casing 3, preferably metallic, which is screwed into an opening 4 in the shell 5 of a boiler or other like container, so that the ends of the wire and casing 3 project into the water or steam space. The rod 2 has an enlargement 6, so that it can be packed steam and water tight in a stuffing-box 7 in the casing 3. The inner end of the casing 3 surrounds the wire 1, projecting from the rod 2, so as to give ample surface for electric contact and to prevent damage to the wire 1, and to allow free access of water, while avoiding mud lodging in the end of the casing, it is perforated or indented, as at 8.

9 is a cover secured to the casing 3 and surrounding the outer end of the wire 1, which has a terminal clamp 10 for securing thereto an electric conducting-wire 11, which passes insulated through an opening 12 in the side of the cover 9.

13 is a covering-pipe to protect the wire 11.

14 is a return or earth wire connected to the casing 3 or to the metal 5.

15 is a cap on the cover 9, through which access can be had to the terminal 10.

9ª is a weep-hole in the cover 9 to allow escape of water leaking from the stuffing-box. The cap 15 may be fastened by a lead rivet 16 or otherwise locked.

17 18 19 20 21 22 indicate the shells of six steam-boilers or other containers, each having a casing 3, with its connections secured therein. The wires 11 are connected to corresponding contact-pieces 23 24 25 26 27 28, while the common return-wire 14 is connected, through an indicator 29, electromagnet 30, and battery 31 or other source of electricity, to a rotary switch-arm 32, which can contact successively with the pieces 28 to 23.

33 34 35 36 37 38 are contact-pieces connected to each other and through a resistance 39 to contact-pieces 40 41 42 43 44 45.

The switch-arm 32 carries insulated therefrom a bridge-piece 46 for making contact between the pieces 23 40, 24 41, 25 42, 26 43, 27 44, 28 45. The shaft 47 of the arm 32 may be rotated by a cord 48 and weight 49 or by other convenient mechanism, so that the arm 32 passes successively over the six sets of contact-pieces.

50 is an escapement-catch pivoted at 51 to retain the arm 32 in normal position. The catch 50 has an armature 52 attached thereto and disposed in front of an electromagnet 53.

54 is a clock provided with a non-conductive disk 55, having contact-pieces 56 thereon. The disk is arranged to revolve at a certain rate—say one revolution per hour—and as each contact 56 closes the circuit through the contact-pins 57 the electromagnet 53 is energized, the armature 52 attracted, and the switch-arm 32 allowed to rotate once.

58 is an armature above the magnet 30 and provided with a marking-point disposed above a paper ribbon on a drum 59. The drum 59 is shown apart for clearness; but in practice it may be secured on the shaft 47 of the arm 32 and rotate therewith. Instead of the casing 3 being secured in the boiler itself it may be secured in an auxiliary container 60, connected with the boiler, as shown at Fig. 3. This is a convenient arrangement when it is desired to ascertain the exact level of the water. The wire 1 and inner end of the casing 3 are made longer and arranged vertical or inclined, so that the wire 1 is only gradually submerged as the water rises.

61 is a block of insulating material, to which the end, the wire 1, is attached to keep it steady.

62 represents pipes connecting the container 60 with the steam and water spaces of a boiler in any usual way. I have found in practice that the quantity of current passing depends to a great extent on the surface of wire 1 submerged. Therefore as the water-level in the boiler rises the wire 1 in the container 60 will be more and more submerged and more current will pass the indicator 29, thus deflecting the needle of the indicator farther in proportion. Thus the exact level of the water can be ascertained. Instead of being vertical, as shown, the wire 1 and casing 3 may be at any angle desired so long as one end is higher than the other.

The action of the appliances is as follows: As the disk 55 is revolved by the clock the electric circuit of the magnet 53 is periodically closed and the armature 52 attracted, thus releasing the arm 32, which by means of the weight 49 commences to rotate. When the arm 32 touches the contact-piece 38, the bridge-piece 46 connects the contacts 28 45. A circuit is thus established from the battery 31 through the arm 32, contact 38, resistance 39, contact-pieces 45 28, wire 1 in boiler 22, casing 3, indicator 29, and magnet 30. The resistance, however, is of such strength that when combined with the resistance of the water in the boiler current sufficient to operate the indicator 29 or recorder 58 59 will not pass. If, however, the water in the boiler was allowed to go below the wire 1 and the attendant should endeavor to conceal the neglect by making a metallic contact at some point near the boiler, the total resistance would be so much reduced that the indicator 29 and recorder 58 59 would be operated at an improper position, thus showing that the circuit had been tampered with. When the arm 32 is moved on to the contact-piece 28, the resistance 39 is cut out and the current passes direct from the arm 32 through the contact 28 to the wire 1 in the boiler, and if the water is higher than the wire 1 the indicator 29 and recorder 58 59 will be operated at the proper position, thus showing that the water is at a safe level. If the water should be below the wire 1, no current will pass and the indicator and recorder will not be operated, thus showing by a blank space on the paper ribbon that the water has been at an unsafe level. As the arm 32 continues to rotate it passes over the other sets of contact-pieces successively connected with the other boilers and a number of marks are made or blanks left on the paper ribbon in certain positions, thus showing whether the water in each boiler has been maintained at a safe level or not or whether any of the electric circuits have been tampered with. When the arm 32 has made one revolution, it is arrested by the catch 50 until the circuit through the magnet 53 is again closed by one of the contact-pieces 56 on the disk 55. Any other convenient automatic periodical recording mechanism than that described may be used or such mechanism may be dispensed with and the switch-arm 32 moved by hand when required, the indicator 29 alone being then used, which indicator may be a pointer, shutter-bell, or other convenient well-known device.

What I claim is—

1. A water-level indicator consisting of an electric conducting-wire partly inclosed in insulating material packed fluid-tight in a casing secured in the shell of the water-container adapted to expose the wire in the interior of the container the inner end of the casing extending over the exposed part of the wire and being slotted, a source of electricity, an indicator, connecting line-wires, and a switch, substantially as described.

2. A water-level indicator consisting of an electric conducting-wire partly inclosed in insulating material packed fluid-tight in a casing secured in the shell of the water-container adapted to expose the wire in the interior of the container, a cover attached to the casing and surrounding the outer terminal of the wire and having an opening therein for the line-wire, a cap on the cover secured by a locking device, a source of electricity, an indicator, connecting line-wires, and a switch, substantially as described.

In testimony whereof I have signed my name to this specification in the presence of two subscribing witnesses.

JOHN THOMAS DAWES.

Witnesses:
W. B. JOHNSON,
H. LIGHTFOOT.